(12) United States Patent
Kuroi (10) Patent No.: US 8,254,025 B1
(45) Date of Patent: Aug. 28, 2012

(54) SCREEN UNIT

(75) Inventor: Kiyoshi Kuroi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/357,687

(22) Filed: Jan. 25, 2012

(51) Int. Cl.
*G03B 21/56* (2006.01)

(52) U.S. Cl. ........................................ 359/461

(58) Field of Classification Search ............... 359/443, 359/461
See application file for complete search history.

(56) References Cited

U.S. PATENT DOCUMENTS

| | | | | |
|---|---|---|---|---|
| 5,341,241 A | * | 8/1994 | Shopp | 359/443 |
| 5,353,152 A | * | 10/1994 | Realmuto | 359/461 |
| 7,405,876 B2 | * | 7/2008 | Choi | 359/461 |
| 7,623,290 B2 | * | 11/2009 | Liang et al. | 359/443 |
| 8,107,166 B2 | * | 1/2012 | Tsai Chen | 359/461 |

FOREIGN PATENT DOCUMENTS

| | | |
|---|---|---|
| JP | 08-262574 | 10/1996 |
| JP | 2002-049099 | 2/2002 |

* cited by examiner

*Primary Examiner* — Christopher Mahoney
(74) *Attorney, Agent, or Firm* — Workman Nydegger (57) ABSTRACT

A screen unit includes a flexible screen, a pantograph mechanism which expands and stores the screen, a motor which shifts one end of the pantograph mechanism to stretch and contract the pantograph mechanism, and a wire. The screen unit further includes a housing which accommodates these components, and a cover which opens and closes at the time of expansion and storage of the screen. One end of the wire is held by the electric motor, and the other end of the wire is held by the cover, so that the cover can be closed in accordance with the contraction of the pantograph mechanism effected by the motor.

8 Claims, 6 Drawing Sheets

SCREEN UNIT

BACKGROUND

1. Technical Field

The present invention relates to a screen unit.

2. Related Art

A screen unit is known as a unit provided with a screen which reflects projection light projected from a projection type display apparatus such as a projector to display an image. A certain type of the screen unit generally known has a link mechanism which moves the screen upward and downward. This screen unit further has a housing which accommodates the link mechanism and the screen. For moving the screen upward and downward, the screen unit opens and closes a cover provided on the housing. Generally, this cover is manually opened and closed by the operation of a user. However, there is a type of screen unit capable of opening and closing the cover by actuation of a motor or other devices.

JP-A-2002-49099 discloses a cabinet for a screen unit provided with a screen accommodated within a cabinet main body. A top plate provided on the upper surface of the cabinet main body has an opening opened and closed by a cover. According to this structure, the position of the screen switches between an expanding condition in which the screen stands through the opening and expands in a flat shape, and a storing condition in which the screen is stored within the cabinet main body positioned below the opening.

Another reference JP-A-8-262574 discloses a reflection type projection screen which has a storage case and a stand. A storage case main body of the storage case has a storage case portion which accommodates a screen main body of the reflection type projection screen, and a cover which opens and closes the storage case portion. The storage case main body further has a cover closing operation temporary stop mechanism which stops and suspends the rotation of the opened cover in the cover closing direction.

According to the cabinet disclosed in JP-A-2002-49099, the method for opening and closing the cover is not specifically described. On the other hand, as for the screen disclosed in JP-A-8-262574, the opening and closing operation of the cover and the upward and downward movement of the screen are performed by different independent mechanisms.

In case of a screen unit whose cover is manually opened and closed, the cover is often left unclosed due to the troublesome operation for opening and closing the cover. When the cover remains unclosed, dust adheres to the screen accommodated in the housing and causes degradation of images projected on the screen in some cases. On the other hand, in case of a screen unit which opens and closes the cover by the operation of a motor, the opening and closing mechanism required for this purpose raises the cost.

Accordingly, development of such a screen unit has been demanded which has a simple structure for opening and closing the cover and prevents an unclosed condition of the cover left without notice.

SUMMARY

An advantage of some aspects of the invention is to solve at least a part of the aforementioned problems and the invention can be implemented as the following forms or application examples.

Application Example 1

This application example of the invention is directed to a screen unit including: a flexible and substantially rectangular screen; a link mechanism which stretches and contracts while holding the screen to expand and store the screen; a housing which has a cover opening and closing at the time of expansion and storage of the screen, and accommodates the screen and the link mechanism; an actuator which is disposed within the housing and shifts one end of the link mechanism to stretch and contract the link mechanism; and a linear member one end of which is held by the actuator and the other of which is held by the cover to close the cover in accordance with the contraction of the link mechanism effected by the actuator.

According to the screen unit having this structure, the cover is closed in accordance with the contraction of the link mechanism effected by the actuator provided for stretching and contracting the link mechanism. In this case, the cover is closed by using the linear member one end of which is held by the actuator and the other end of which is held by the cover. Accordingly, the structure for closing the cover can be simplified.

Application Example 2

It is preferable that the actuator of the screen unit according to the above application example of the invention has a motor, a shaft member rotated by the motor, and a translatory member which translationally shifts in accordance with the rotation of the shaft member, and that the one end of the linear member is held by the translatory member.

According to the screen unit having this structure, the cover can be easily closed in accordance with the translational movement of the translatory member following the rotation of the shaft member by using the simple component of the linear member whose one end is held by the translatory member.

Application Example 3

It is preferable that the translatory member of the screen unit of the above application example of the invention is provided in such a condition as to freely contact and move away from the one end of the link mechanism, and shifts the one end of the link mechanism by the contact with the one end of the link mechanism.

According to the screen unit having this structure, the one end of the link mechanism to which a force for contracting the screen is constantly applied can be shifted to stretch and contract the link mechanism for expansion and storage of the screen by the contact between the translatory member and the one end of the link mechanism, for example. Moreover, operation after the storage of the screen and before the expansion of the screen can be performed in accordance with the translational movement of the translatory member following the rotation of the shaft member by the separation of the translatory member from the one end of the link mechanism.

Application Example 4

It is preferable that the screen unit of the above application example of the invention further includes a regulating member which regulates at a predetermined position shift of the link mechanism in the contracting direction of the link mechanism. In this case, the cover is closed by shift of the translatory member under the condition in which the shift of the link mechanism is regulated by the regulating member.

According to the screen unit having this structure, the position for storing the screen can be determined by regulation of the shift of the link mechanism via the regulating member. Moreover, the cover can be securely closed by the shift of the translatory member after the screen is stored.

Application Example 5

It is preferable that the actuator of the screen unit according to the above application example of the invention has a motor, and a shift member which moves forward and backward by the drive of the motor, and that the one end of the linear member is held by the shift member.

According to the screen unit having this structure, the cover can be easily closed by using the simple component of the linear member whose one end is held by the shift member.

Application Example 6

It is preferable that the shift member of the screen unit according to the above application example of the invention is provided in such a condition as to freely contact and move away from the one end of the link mechanism, and shifts the one end of the link mechanism by the contact with the one end of the link mechanism.

According to the screen unit having this structure, the one end of the link mechanism to which a force for contracting the screen is constantly applied can be shifted to stretch and contract the link mechanism for expansion and storage of the screen by the contact between the shift member and the one end of the link mechanism, for example. Moreover, operation after the storage of the screen and before the expansion of the screen can be performed in accordance with the translational movement of the shift member following the rotation of the shaft member by the separation of the shift member from the one end of the link mechanism.

Application Example 7

It is preferable that the screen unit according to the above application example of the invention further includes a regulating member which regulates at a predetermined position the one end of the link mechanism in the contracting direction of the link mechanism. In this case, the cover is closed by shift of the shift member under the condition in which the shift of the link mechanism is regulated by the regulating member.

According to the screen unit having this structure, the position for storing the screen can be determined by regulation of the one end of the link mechanism via the regulating member. Moreover, the cover can be securely closed by the shift of the shift member after the screen is stored.

Application Example 8

It is preferable that the screen unit of the above application example of the invention further includes an urging member which urges the cover in the opening direction of the cover.

According to the screen unit having this structure, the urging member urges the cover in the opening direction of the cover. In this case, the link mechanism or the screen need not contact the cover to open the cover in accordance with the stretch of the screen by the link mechanism. Thus, the cover can be easily opened.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments according to the invention are hereinafter described with reference to the drawings.

First Embodiment

Figure 1A:
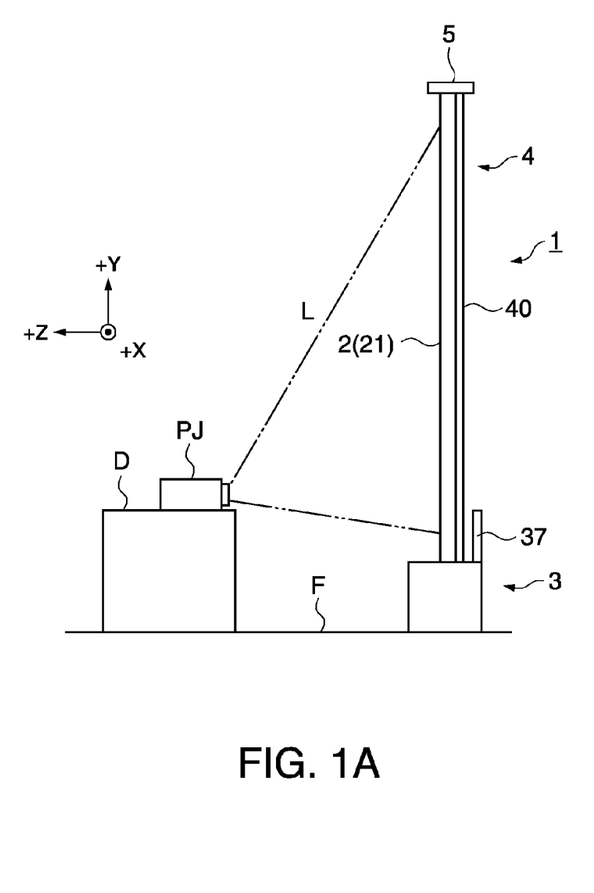
FIGS. 1A and 1B illustrate a screen unit according to a first embodiment.
Figure 1B:
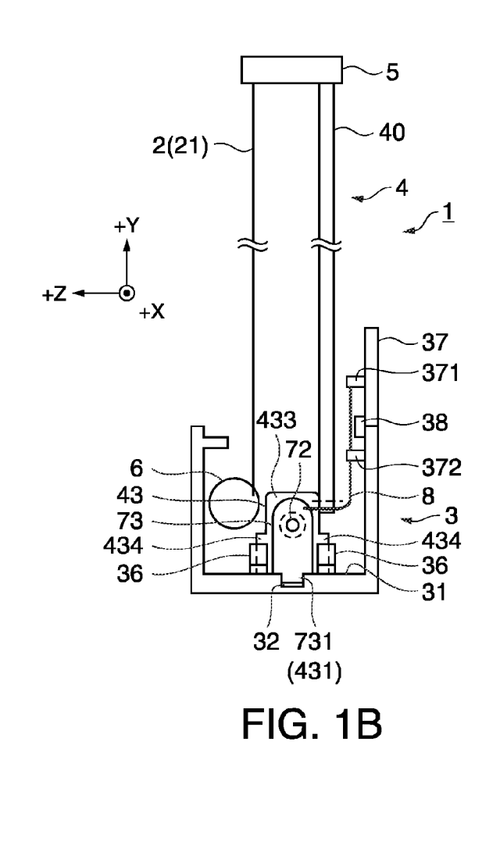

FIGS. 1A and 1B illustrate a screen unit 1 according to a first embodiment. FIG. 1A is a side view schematically showing the screen unit 1 in the condition of use. FIG. 1B is a side view schematically showing the screen unit 1 as viewed from the inside of a housing 3. The general structure of the screen unit 1 in this embodiment is now briefly explained with reference to FIGS. 1A and 1B.

The screen unit 1 in this embodiment is of a reflection type screen unit 1 placed on a floor surface F or other places for installation. For use of the screen unit 1, a flexible and substantially rectangular screen 2 of the screen unit 1 is drawn from the inside of the housing 3 having a rectangular parallelepiped box shape toward above (direction substantially perpendicular to the floor surface F), in which condition the screen 2 stands on the floor surface F and comes into a usable condition. The screen 2 reflects projection light L emitted from a projector PJ placed on a disk top surface D (or floor surface F) or others such that the projection light L can reach an observer.

In the respective figures including FIGS. 1A and 1B, dimensions and proportions of the components shown therein are different from the actual ones so that these components can be visually recognized in the figures. Moreover, in the respective figures including FIGS. 1A and 1B, the components are shown by using an XYZ rectangular coordinate system for convenience of explanation. In this XYZ rectangular coordinate system, a Y direction corresponds to the direction perpendicular to the floor surface F (+Y direction: direction toward the screen 2 in the standing condition from the floor surface F), an X direction corresponds to the direction parallel with the surface of a screen base 21 of the standing screen 2 and perpendicular to the Y direction (+X direction: right direction as viewed from the front of the reflection surface of the screen 2 in the standing condition), and a Z direction corresponds to the direction perpendicular to the Y direction and the X direction (+Z direction: direction toward the front from the reflection surface of the screen 2 in the standing condition). Furthermore, the direction of gravity corresponds to the downward direction, and the direction opposite to the direction of gravity corresponds to the upward direction, both determined based on the direction of gravity.

As illustrated in FIGS. 1A and 1B, the screen unit 1 includes the screen 2 and the housing 3. The housing 3 accommodates a pantograph mechanism 4 provided as a link mechanism in such a condition that the pantograph mechanism 4 can freely expand and contract. A screen holding unit 5 provided at the upper end of the pantograph mechanism 4 holds the upper end of the screen 2. The lower end of the screen 2 is fixed to a spring-type winding mechanism 6 disposed inside the housing 3.

The winding mechanism 6 is provided with a winding shaft (not shown) having a length substantially equivalent to the length of the screen 2 in the width direction (X direction). The winding mechanism 6 has a spring member (not shown) which constantly exerts a pulling force in the winding direction. This force constantly pulls the screen 2 at the time of expansion and storage (wind), thereby reducing looseness of the screen 2.

The screen 2 is drawn from the winding mechanism 6 in accordance with the stretching operation of the pantograph mechanism 4 in the upward direction (+Y direction). On the other hand, the screen 2 is wound around the winding mechanism in accordance with the contracting operation of the pantograph mechanism 4 in the downward (−Y direction) to be stored in the housing 3.

Figure 2A:
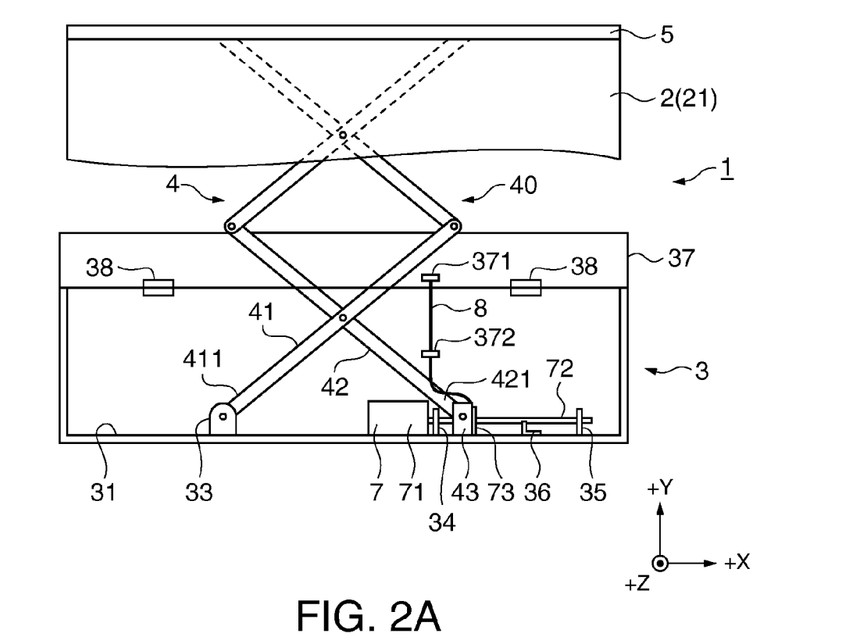
FIGS. 2A and 2B are plan views schematically illustrating the screen unit.
Figure 2B:
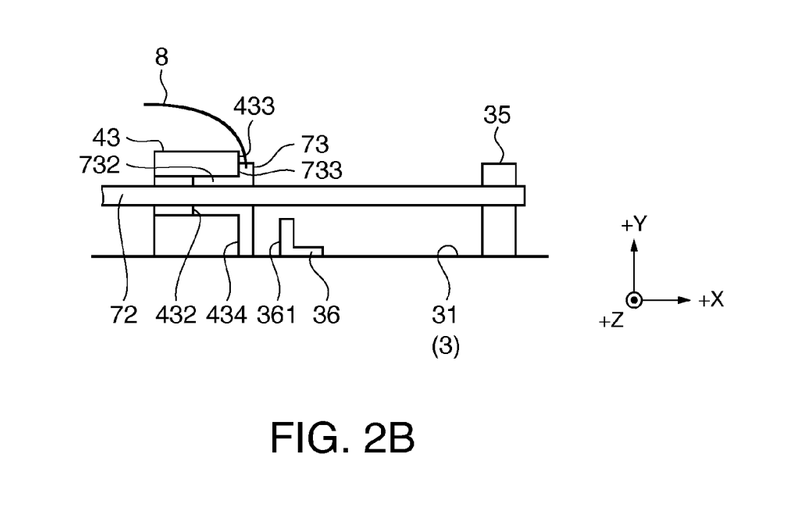

FIGS. 2A and 2B are plan views schematically illustrating the screen unit 1. FIG. 2A is a plan view of the general structure. FIG. 2B is a cross-sectional enlarged view illustrating the general structure around a shaft member 72.

FIGS. 2A and 2B chiefly show the structure of the interior of the housing 3. FIGS. 1A through 2B illustrate a condition of the pantograph mechanism 4 expanded to the maximum. This condition corresponds to the use condition of the screen unit 1. The details of the structure and operation of the screen unit 1 are now explained with reference to FIGS. 1A through 2B.

As illustrated in FIGS. 2A and 2B, the screen unit 1 in this embodiment has an electric motor 7 provided as an actuator disposed on a bottom surface 31 of the interior of the housing 3 and functioning as a driving source for operating the pantograph mechanism 4. The electric motor 7 has the threaded shaft member 72 which extends in the +X axis direction from a motor main body 71. The shaft member 72 in this embodiment is a so-called ball screw. The shaft member 72 may be constituted by other screws such as a trapezoidal screw. The shaft member 72 rotates (in both the normal direction and reverse direction) in accordance with the drive of the motor main body 71. The motor main body 71 side end and the opposite distal end of the shaft member 72 are guided by guiding members 34 and 35, respectively, provided on the bottom surface 31.

The electric motor 7 further has a translatory member 73 which translationally moves in a direction along the shaft member 72 in accordance with the rotation of the shaft member 72. The translatory member 73 has a shape threaded in correspondence with the shape of the screw shape of the shaft member 72 so as to translationally shift by engagement with the screw shape of the shaft member 72. As illustrated in FIG. 1B, a guide projection 731 is formed on the lower part of the translatory member 73. Moreover, as illustrated in FIG. 1B, a guide groove 32 concaved in the bottom surface 31 extends in the same direction as the extending direction of the shaft member 72. The translatory member 73 translationally shifts in accordance with the rotation of the shaft member 72 by the engagement between the guide projection 731 and the guide groove 32. The guide projection 731 herein has a function of preventing rotation of the translatory member 73. More specifically, the guide projection 731 prevents rotation of the translatory member 73 following the rotation of the shaft member 72, and allows the translatory member 73 to perform translational movement.

As can be seen from FIG. 2A, the pantograph mechanism 4 has a plurality of arms 40 linked with each other in such a manner as to freely stretch and contract. An end 411 of a first arm 41 of the plural arms 40 is rotatably supported by a first arm support member 33 provided on the bottom surface 31 of the housing 3. On the other hand, an end 421 of a second arm 42 is rotatably supported by a second arm support member 43 with the shaft member 72 inserted through the end 421. The second arm support member 43 can freely shift in the extending direction of the shaft member 72.

As illustrated in FIG. 1B, a guide projection 431 is provided on the lower part of the second arm support member 43 similarly to the guide projection 731 of the translatory member 73. The second arm support member 43 can freely shift by the engagement between the guide projection 431 and the guide groove 32 with which the guide projection 731 of the translatory member 73 also engages.

A pair of regulating members 36 are provided on the bottom surface 31 on both sides of the shaft member 72 so as to limit (stop) the second arm support member 43 shifting along the shaft member 72 to a predetermined position. As illustrated in FIGS. 1B and 2B, the regulating members 36 regulate the shift of the second arm support member 43 in the +X direction by the contact between a contact surface 434 of the second arm support member 43 and contact surfaces 361 of the regulating members 36. The second arm support member 43 which does not engage with the shaft member 72 stops moving by the contact with the regulating members 36. As can be seen from FIG. 1B, the translatory member 73 is so shaped as to pass through the space between the two regulating members 36. Thus, the translatory member 73 not subjected to regulation by the regulating members 36 shifts along the shaft member 72 while engaging with the shaft member 72.

A cover 37 is provided on the top surface of the housing 3 as a cover which opens and closes at the time of expansion and storage of the screen 2. The cover 37 has a pair of urging members 38 which constantly give an urging force to the cover 37 in the opening direction. The cover 37 opens toward the rear of the screen 2 (−Z direction) by the force of the urging members 38 when no external force is applied to the cover 37 in the closing direction.

The screen unit 1 has a wire 8 as a linear member. The wire 8 is a component provided for closing the cover 37. An end (the other end) of the wire 8 is fixed to a projection 371 projecting from approximately the center of the inner surface of the cover 37. An end (one end) of the wire 8 is fixed to the translatory member 73 via a junction 372 provided on the inner surface of the housing 3 disposed below the cover 37 when the cover 37 is opened.

As illustrated in FIG. 2B, the translatory member 73 has an insertion portion 732 which projects toward the motor main body 71 when the translatory member 73 is attached to the shaft member 72. The second arm support member 43 has a receiving portion 432 concaved to receive the insertion portion 732 of the translatory member 73. The translatory member 73 has a contact surface 733 on the periphery of the insertion portion 732. The second arm support member 43 has a contact surface 433 on the periphery of the receiving portion 432, which surface 433 is a surface in contact with the contact surface 733 of the translatory member 73.

The general operation of the screen unit 1 performed for transition to the condition shown in FIGS. 2A and 2B is now explained.

As noted above, FIGS. 2A and 2B illustrate the condition of the pantograph mechanism 4 expanded to the maximum. This expanded condition of the pantograph mechanism 4 is achieved by actuation of the electric motor 7. More specifically, the shaft member 72 is rotated (in the normal direction in this case) by the drive of the electric motor 7, which rotation moves (translationally shifts) the translatory member 73 toward the motor main body 71, whereby the second arm support member 43 shifts toward the motor main body 71.

In this case, the translatory member 73 shifts the second arm support member 43 by the contact between the contact surface 433 of the second arm support member 43 and the contact surface 733 of the translatory member 73, which contact has been produced by insertion of the insertion portion 732 of the translatory member 73 into the receiving portion 432 of the second arm support member 43. In accordance with the shift of the second arm support member 43 toward the motor main body (−X direction), both the end 421 of the second arm 42 supported by the second arm support member 43, and the end 411 of the first arm 41 supported by the first arm support member 33 rotate. As a result, the pantograph mechanism 4 stretches upward (+Y direction).

The rotation of the shaft member 72 is controlled by a not-shown controller based on the position of the translatory member 73 detected by a not-shown sensor. In this case, the condition in which the screen 2 has reached the position for use (maximum expanded condition) illustrated in FIGS. 2A and 2B is determined based on the detection that the translatory member 73 has reached the predetermined position. When the sensor determines that the translatory member 73 has reached the predetermined position, the controller stops the drive of the electric motor 7.

In the period before the translatory member 73 contacts the second arm support member 43 and starts pressing the second arm support member 43 toward the motor main body 71, the wire 8 fixed to the translatory member 73 loosens. In this condition, the cover 37 is opened by the urging force of the urging members 38. This condition will be described later in detail.

In the condition shown in FIGS. 2A and 2B, the electric motor 7 does not operate, and the translatory member 73 keeps engaging the shaft member 72. Under this condition, the weights of the plural arms 40 of the pantograph mechanism 4, and the weights of the screen holding unit 5 and the screen 2 are applied to the contact surface 733 via the contact surface 433 of the second arm support member 43.

Figure 3A:
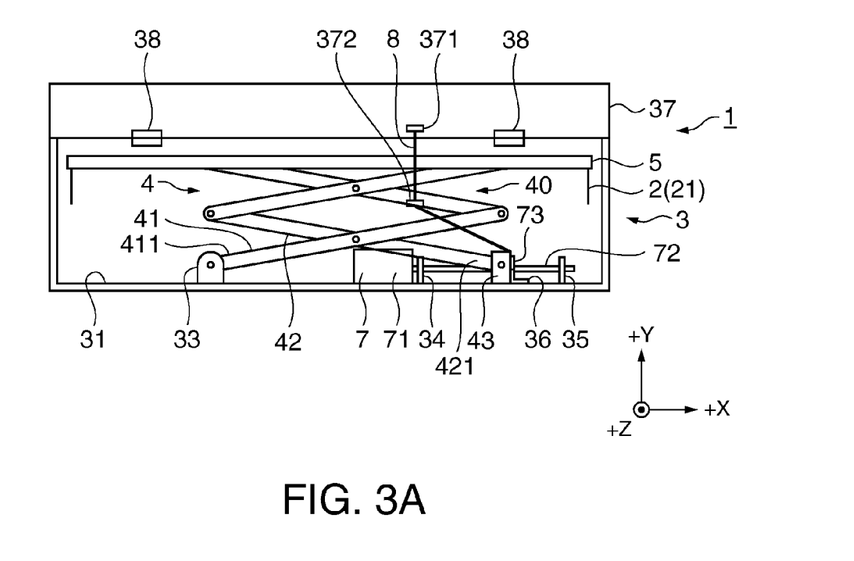
FIGS. 3A and 3B are plan views schematically illustrating the screen unit.
Figure 3B:
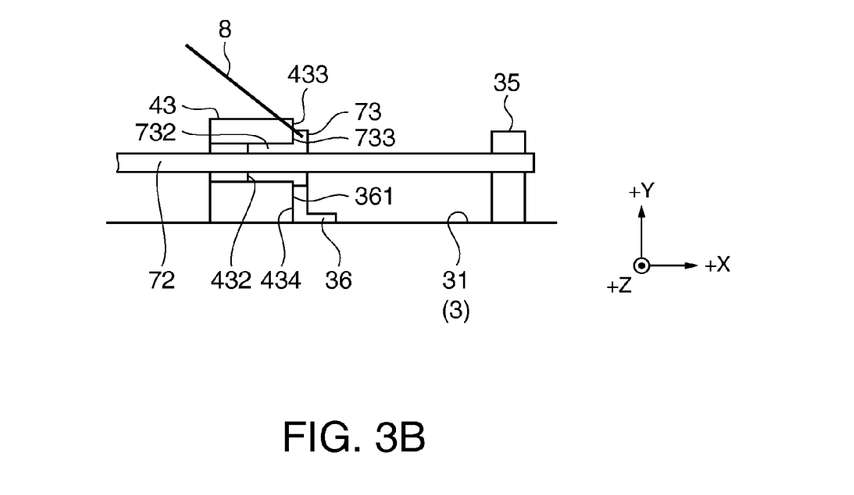
Figure 4A:
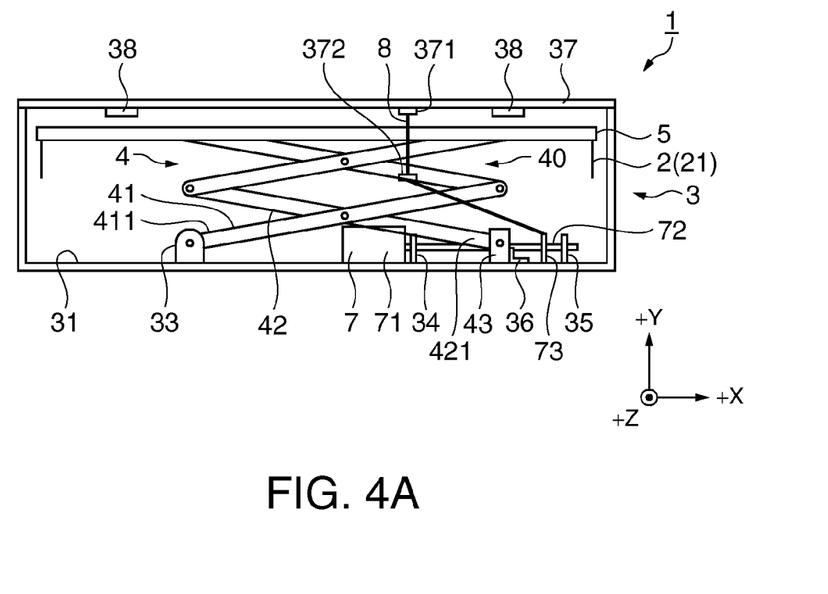
FIGS. 4A and 4B are plan views schematically illustrating the screen unit.
Figure 4B:
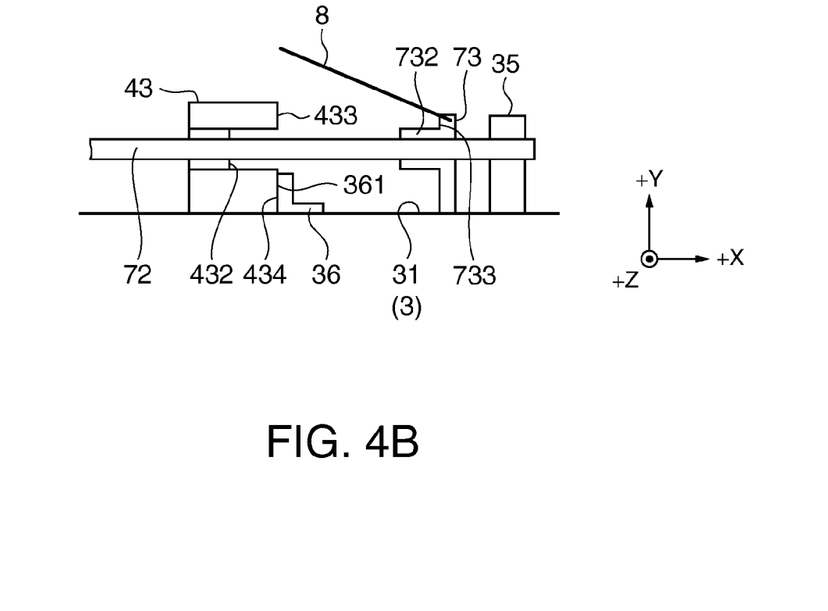

FIGS. 3A and 3B are plan views schematically illustrating the screen unit 1. FIG. 3A is a plan view showing the general structure. FIG. 3B is a cross-sectional enlarged view schematically showing the structure around the shaft member 72. FIGS. 4A and 4B are plan views schematically illustrating the screen unit 1. FIG. 4A is a plan view showing the general structure. FIG. 4B is a cross-sectional enlarged view schematically showing the structure around the shaft member 72. FIGS. 3A and 3B illustrate the pantograph mechanism 4 contracted to the maximum to come into the stored condition of the screen 2 within the housing 3. FIGS. 4A and 4B illustrate a condition in which the cover 37 is closed. The details of the operation of the screen unit 1 performed in the transition from the expanded condition of the screen 2 (FIGS. 2A and 2B) to the stored condition of the screen 2 (FIGS. 3A through 4B) are now explained with reference to FIGS. 1A through 4B.

In response to the start of operation of the electric motor 7 under the condition shown in FIGS. 2A and 2B, the shaft member 72 initiates rotation (reverse rotation). The translatory member 73 starts moving toward the distal end of the shaft member 72 (+X direction) in accordance with the rotation of the shaft member 72. Then, the second arm support member 43 pressing the translatory member 73 starts moving in accordance with the movement of the translatory member 73. The second arm 42 and the first arm 41 start shifting in their contracting direction (downward direction) by the movement of the second arm support member 43, whereby the pantograph mechanism 4 starts shifting downward. As a result, the screen holding unit 5 starts moving downward, allowing the screen 2 to be wound around the winding mechanism 6 with the downward movement of the screen holding unit 5.

As illustrated in FIGS. 3A and 3B, the second arm support member 43 shifting in accordance with the movement of the translatory member 73 comes into contact with the regulating members 36. By the contact between the second arm support member 43 and the regulating members 36, the shift of the second arm support member 43 is regulated and stopped. In this condition, the pantograph mechanism 4 is folded within the housing 3 so that the screen holding unit 5 can be stored within the housing 3.

In the period before the second arm support member 43 contacts the regulating members 36, the wire 8 fixed to the translatory member 73 loosens between the projection 371, the junction 372, and the translatory member 73. In this condition, the cover 37 is opened by the force of the urging member 38. After the second arm support member 43 contacts the regulating members 36, the wire 8 becomes tensioned between the projection 371, the junction 372, and the translatory member 73.

As noted above, the translatory member 73 is not regulated by the regulating members 36. Thus, the translatory member 73 continues shifting in the +X direction in accordance with the rotation of the shaft member 72 and moves away from the second arm support member 43 after the contact between the second arm support member 43 and the regulating members 36. By this movement of the translatory member 73, the wire 8 starts pulling the projection 371 to which the other end of the wire 8 is fixed. As a result, the cover 37 gradually closes by the force of the wire 8 pulling the projection 371 (force for closing the cover 37) while resisting the urging force of the urging members 38 for opening the cover 37.

When the translatory member 73 reaches the predetermined position as illustrated in FIGS. 4A and 4B, the controller stops the drive of the electric motor 7 based on the detection of the position of the translatory member 73 by the sensor so as to stop the movement of the translatory member 73. The predetermined position of the translatory member 73 is set at a position where the cover 37 can be completely closed with the pull of the wire 8.

By these processes, the pantograph mechanism 4, the screen holding unit 5, and the screen 2 come into the stored condition within the housing 3 along with the closed condition of the cover 37.

The operation of the screen unit 1 performed for transition from the closed condition of the cover 37 (condition shown in FIGS. 4A and 4B) to the expanded condition of the screen 2 (condition shown in FIGS. 2A and 2B) along with the opened condition of the cover 37 is now explained.

In response to the start of operation of the electric motor 7 under the condition shown in FIGS. 4A and 4B, the shaft member 72 initiates rotation (normal rotation). The translatory member 73 starts moving toward the motor main body 71 (−X direction) in accordance with the rotation of the shaft member 72. The wire 8 shifts in such a direction as to loosen in accordance with the movement of the translatory member 73 toward the motor main body 71 (−X direction).

The cover 37 shifts in the opening direction by the force of the urging members 38 by the amount corresponding to the loosening amount of the wire 8. Then, the cover 37 completely opens immediately before the contact between the translatory member 73 and the second arm support member 43 whose movement is stopped by the regulating members 36.

After the contact between the translatory member 73 continuously moving and the second arm support member 43, the second arm support member 43 starts moving toward the motor main body 71 (−X direction) in accordance with the shift of the translatory member 73. By the shift of the second arm support member 43, the pantograph mechanism 4 which has the second arm 42 supported by the second arm support member 43 and the first arm 41 supported by the first arm support member 33 initiates stretching to expand the screen 2. After the cover 37 opens (after contact between the translatory member 73 and the arm support member 43), the wire 8 becomes bent within the housing 3. The operation of the pantograph mechanism 4 after the contact between the translatory member 73 and the second arm support member 43 is similar to the corresponding operation described above, and the same explanation is not repeated.

According to the first embodiment, the following advantages can be provided.

The cover 37 of the screen unit 1 in this embodiment is closed in accordance with the contraction of the pantograph mechanism 4 effected by the drive of the electric motor 7 provided for expansion and contraction of the pantograph mechanism 4. The contraction of the pantograph mechanism 4 is performed by using the wire 8 whose one end is held by the translatory member 73 of the electric motor 7, and whose other end is held by the opening closing cover 37. More specifically, the cover 37 is closed in accordance with the translational movement of the translatory member 73 produced by the rotation of the shaft member 72 of the electric motor 7. Thus, the cover 37 can be closed by a simple structure. Moreover, the cost required for the opening and closing structure can be reduced by simplification of the structure.

According to the screen unit 1 in this embodiment, the cover 37 is not left unclosed. In this case, dust does not adhere to the screen 2 stored within the housing 3, in which condition quality degradation of images projected on the screen 2 can be avoided.

According to the screen unit 1 in this embodiment, the translatory member 73 is provided in such a condition as to freely contact and move away from one end of the pantograph mechanism 4 (more specifically, the second arm support member 43 supporting the second arm 42). In this case, the translatory member 73 can move the second arm 42 in such a direction as to stretch and contract the pantograph mechanism 4 for expansion and storage of the screen 2 by the contact between the translatory member 73 and the second arm support member 43 to which an urging force in the contracting direction of the screen 2 is constantly applied. Moreover, the cover 37 can be closed after the storage of the screen 2 and opened before the expansion of the screen 2 by the translational movement of the translatory member 73 in accordance with the rotation of the shaft member 72 after separation of the translatory member 73 from the second arm support member 43.

According to the screen unit 1 in this embodiment, the movement of one end of the pantograph mechanism 4 (more specifically, the second arm support member 43 supporting the second arm 42) is regulated by the regulating members 36. Thus, the position for storing the screen 2 can be determined. Moreover, the cover 37 can be securely closed after the storage of the screen 2 in accordance with the movement of the translatory member 73.

According to the screen unit 1 in this embodiment, the urging members 38 are equipped. In this case, components such as the pantograph mechanism 4 and the screen holding unit 5 need not contact the cover 37 when opening the cover 37, which facilitates the operation for opening the cover 37.

Second Embodiment

Figure 5A:
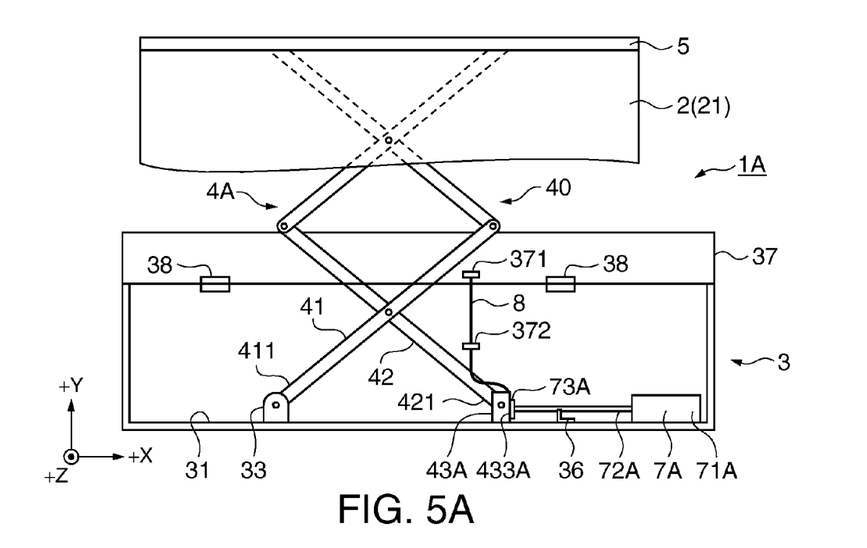
FIGS. 5A through 5C are plan views schematically illustrating a screen unit according to a second embodiment.
Figure 5B:
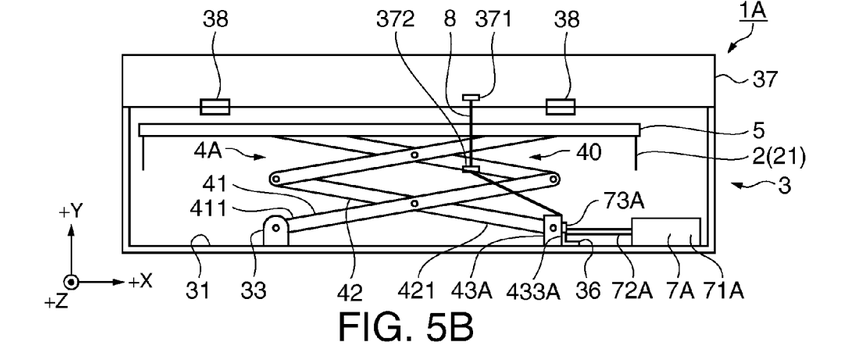
Figure 5C:
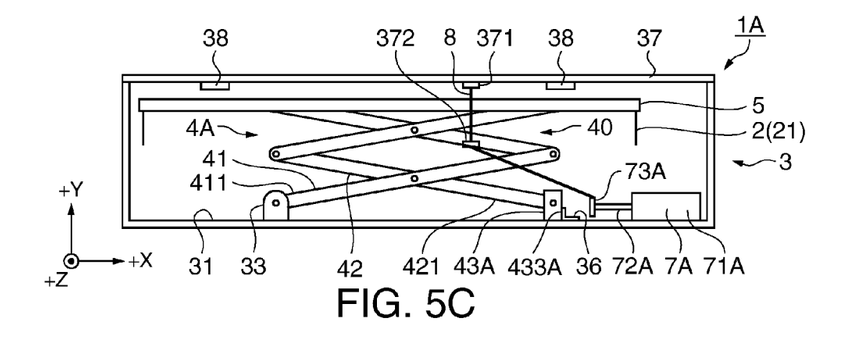

FIGS. 5A through 5C are plan views schematically illustrating a screen unit 1A according to a second embodiment.

FIG. 5A shows a condition of a pantograph mechanism 4A expanded to the maximum. FIG. 5B shows a condition of the pantograph mechanism 4A contracted to the maximum. FIG. 5C shows a closed condition of the cover 37. The structure and operation of the screen unit 1A are now explained with reference to FIGS. 5A through 5C.

The screen unit 1A in this embodiment includes an electric motor 7A having a structure different from that of the electric motor 7 in the first embodiment. The electric motor 7A in this embodiment has a shaft-shaped shift member 72A which moves forward and backward with respect to a motor main body 71A by the drive of the electric motor 7A. The electric motor 7A in this embodiment is constituted by a so-called linear motor. The electric motor 7A is disposed on the +X side of a second arm support member 43A (described later). The shift member 72A which moves forward and backward with respect to the motor main body 71A is disposed on the −X side of the motor main body 71A.

A pressing portion 73A which contacts and presses a contact surface 433A of the second arm support member 43A is provided at the tip of the shift member 72A. The one end of the wire 8 which closes the cover 37 similarly to the first embodiment is fixed to the pressing portion 73A.

According to the screen unit 1A in this embodiment, the structure of connection between the pantograph mechanism 4A and the electric motor 7A, the structure of connection between the wire 8 and the electric motor 7A and the like are different from the corresponding structures in the first embodiment due to the different structure of the electric motor 7A.

The basic structure of the pantograph mechanism 4A in this embodiment which has the plural arms 40 is similar to the basic structure of the pantograph mechanism 4 in the first embodiment. However, the pantograph mechanism 4A is different from the pantograph mechanism 4 in that the second arm support member 43A supporting the second arm 42 of the pantograph mechanism 4A is provided in such a condition as to freely shift on the shift path of the shift member 72A.

The second arm support member 43A does not have the receiving portion 432 equipped in the first embodiment. The second arm support member 43A has a guide projection (not shown) similar to the guide projection 431 in the first embodiment. The second arm support member 43A can freely and linearly move by the engagement between the guide projection and a groove-shaped guide groove (not shown) formed in the bottom surface 31 of the housing 3 and extended to be opposed to the shift path of the shift member 72A. The end 411 of the first arm 41 is rotatably supported on the first arm support member 33 similarly to the first embodiment.

The other structures are substantially similar to the corresponding structures in the first embodiment. The components and parts in the second embodiment similar to the corresponding components and parts in the first embodiment are given similar reference numbers.

As noted above, FIG. 5A illustrates the pantograph mechanism 4A expanded to the maximum. This expanded condition of the pantograph mechanism 4A can be achieved by the actuation of the electric motor 7A. More specifically, the shift member 72A is moved forward (shifted in the −X direction) by the drive of the electric motor 7A, which movement allows the pressing portion 73A to press and shift the second arm support member 43A in the −X direction.

The pressing portion 73A can shift the second arm support member 43A by the contact between the pressing portion 73A and the contact surface 433A of the second arm support member 43A and the press of the pressing portion 73A against the contact surface 433A. When the second arm support member 43A shifts to the side opposite to the motor main body 71A (in the −X direction), the end 421 of the second arm 42 rotates while supported by the second arm support member 43A. Similarly, the end 411 of the first arm 41 rotates while supported by the first arm support member 33. As a result, the pantograph mechanism 4A stretches upward (+Y direction).

The shift of the shift member 72A is regulated by a not-shown controller based on the detection of the position of the pressing portion 73A by a not-shown sensor. In this case, the determination that the screen 2 has come to the position for use (maximum expansion position) as illustrated in FIG. 5A is made based on the detection that the pressing portion 73A has reached the predetermined position. When the sensor detects the condition where the pressing portion 73A has reached the predetermined position, the controller stops the drive of the electric motor 7A.

In the period before the shift member 72A (pressing portion 73A) contacts and starts pressing the second arm support member 43A, the wire 8 fixed to the pressing portion 73A loosens. Thus, the cover 37 is opened by the force of the urging members 38. The details of this condition will be described later.

In the condition shown in FIG. 5A, the electric motor 7A stops driving, and the shift member 72A stops moving accordingly. Under this condition, the weights of the plural arms 40 of the pantograph mechanism 4A, and the weights of the screen holding unit 5 and the screen 2 are applied to the pressing portion 73A in the stopping condition via the contact surface 433A of the second arm support member 43A.

For transition from the condition shown in FIG. 5A to the condition shown in FIG. 5B, the shift member 72A is shifted backward (moved in the +X direction) by the drive of the electric motor 7A. The backward movement of the shift member 72A shifts the pressing portion 73A (backward), and the second arm support member 43A pressing the pressing portion 73A starts moving by the shift of the pressing portion 73A. In accordance with the movement of the second arm support member 43A, the second arm 42 and the first arm 41 starts shifting in their contract directions (downward), whereby the pantograph mechanism 4A starts downward shift. By the shift of the pantograph mechanism 4A, the screen holding unit 5 starts moving downward, allowing the screen 2 to be wound around the winding mechanism 6 in accordance with the shift of the screen holding unit 5.

As illustrated in FIG. 5B, the second arm support member 43A contacts the regulating members 36 when the second arm support member 43A shifts in accordance with the movement of the pressing portion 73A. By the contact between the second arm support member 43A and the regulating members 36, the shift of the second arm support member 43A is regulated and stopped. In this condition, the pantograph mechanism 4A is folded within the housing 3 along with storage of the screen holding unit 5 within the housing 3.

In the period before the contact between the second arm support member 43A and the regulating members 36, the wire fixed to the pressing portion 73A loosens between the projection 371, the junction 372, and the pressing portion 73A, in which condition the cover 37 is opened by the force of the urging members 38. After the contact between the second arm support member 43A and the regulating members 36, the wire 8 becomes tensioned between the projection 371, the junction 372, and the pressing portion 73A.

By the continuous backward movement of the shift member 72A after the contact between the second arm support member 43A and the regulating members 36, the pressing portion 73A not subjected to regulation by the regulating members 36 moves away from the second arm support member 43A. By this movement of the pressing portion 73A, the wire 8 starts pulling the projection 371 to which the other end of the wire 8 is fixed. In accordance with the movement of the pressing portion 73A, the cover 37 gradually closes by the force of the wire 8 pulling the projection 371 (force for closing the cover 37) while resisting the urging force of the urging members 38 for opening the cover 37.

When the pressing portion 73A reaches the predetermined position as illustrated in FIG. 5C, the controller stops the drive of the electric motor 7A based on the detection of the position of the pressing portion 73A by the sensor, allowing the shift member 72A to stop backward movement. The predetermined position of the pressing portion 73A is set at a position where the cover 37 can be completely closed by the pull of the wire 8.

By these processes, the pantograph mechanism 4A, the screen holding unit 5, and the screen 2 come into the stored condition within the housing 3 with the cover 37 closed.

The operation of the screen unit 1A performed for transition from the closed condition of the cover 37 (condition shown in FIG. 5C) to the expanded condition of the screen 2 (condition shown in FIG. 5A) with the cover 37 opened is now explained.

In response to the start of operation of the electric motor 7A under the condition shown in FIG. 5C, the shift member 72A initiates forward movement. The pressing portion 73A starts moving toward the side opposite to the motor main body 71A side (−X direction) in accordance with the forward movement of the shift member 72A. The wire 8 shifts in the loosening direction by the movement of the pressing portion 73A.

The cover 37 shifts in the opening direction by the force of the urging members 38 by the amount corresponding to the loosening amount of the wire 8. Then, the cover 37 completely opens immediately before the contact between the pressing portion 73A and the second arm support member 43A whose movement is stopped by the regulating members 36.

After the contact between the pressing portion 73A continuously moving and the second arm support member 43A, the pressing portion 73A starts shifting the second arm support member 43A toward the side opposite to the motor main body 71A (−X direction) in accordance with the shift (forward movement) of the shift member 72A. By the shift of the second arm support member 43A, the pantograph mechanism 4A which has the second arm 42 supported by the second arm support member 43A and the first arm 41 supported by the first arm support member 33 initiates stretching to expand the screen 2. After the opening of the cover 37 (after contact between the pressing portion 73A and the second arm support member 43A), the wire 8 becomes bent within the housing 3. The operation of the pantograph mechanism 4A performed after the contact between the pressing portion 73A and the second arm support member 43A is similar to the corresponding operation in the first embodiment, and the same explanation is not repeated.

According to the second embodiment, the following advantages substantially similar to the advantages of the first embodiment can be provided. The cover 37 of the screen unit 1A in this embodiment is closed in accordance with the contraction of the pantograph mechanism 4A effected by the drive of the electric motor 7A provided for expansion and contraction of the pantograph mechanism 4A. The contraction of the pantograph mechanism 4A is performed by using the wire 8 whose one end is held by the pressing portion 73A of the electric motor 7A, and whose other end is held by the cover 37. More specifically, the cover 37 is closed by the shift of the pressing portion 73A following the shift of the shift member 72A of the electric motor 7A. Thus, the cover 37 can be closed by a simple structure. Moreover, the cost required for the opening and closing structure can be reduced by simplification of the structure.

According to the screen unit 1A in this embodiment, the cover 37 is not left unclosed. In this case, dust does not adhere to the screen 2 stored within the housing 3, in which condition quality degradation of images projected on the screen 2 can be avoided.

According to the screen unit 1A in this embodiment, the pressing portion 73A is provided in such a condition as to freely contact and move away from one end of the pantograph mechanism 4A (more specifically, the second arm support member 43A supporting the second arm 42). In this case, the pressing portion 73A can move the second arm 42 in such a direction as to stretch and contract the pantograph mechanism 4A for expansion and storage of the screen 2 by the contact between the pressing portion 73A and the second arm support member 43A to which an urging force in the contracting direction of the screen 2 is constantly applied. Moreover, the cover 37 can be closed after the storage of the screen 2 and opened before the expansion of the screen 2 by the shift of the shift member 72A after separation of the pressing portion 73A from the second arm support member 43A.

According to the screen unit 1A in this embodiment, the movement of one end of the pantograph mechanism 4A (more specifically, the second arm support member 43A supporting the second arm 42) is regulated by the regulating members 36. Thus, the position for storing the screen 2 can be determined. Moreover, the cover 37 can be securely closed after the storage of the screen 2 in accordance with the movement of the pressing portion 73A.

According to the screen unit 1A in this embodiment, the urging members 38 are equipped. In this case, components such as the pantograph mechanism 4A and the screen holding unit 5 need not contact the cover 37 for opening the cover 37, which facilitates opening of the cover 37.

The invention is not limited to the embodiments described herein but may be practiced otherwise without departing from the scope of the invention. Therefore, various modifications, improvements and the like including the following changes may be made.

According to the screen unit 1 in the first embodiment, the pantograph mechanism 4 and the screen 2 can be stored within the housing 3 at predetermined heights by regulating the movement of the second arm support member 43 via the regulating members 36 equipped on the bottom surface 31 within the housing 3. However, these regulating members may be disposed at other positions and may regulate other components. For example, the regulating members may be provided at desired positions in the housing 3 to regulate the screen holding unit 5. This modification may be incorporated in the screen unit 1A in the second embodiment. An example of this structure is now explained with reference to FIG. 6.

Figure 6:
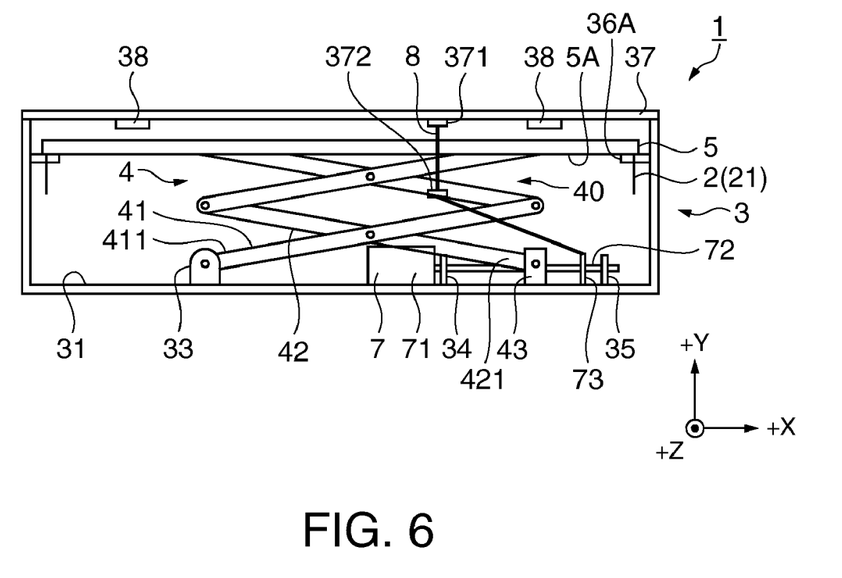
FIG. 6 is a plan view schematically illustrating a condition in which regulating members regulate a screen holding unit in a modified example.

FIG. 6 is a plan view schematically illustrating a condition in which regulating members 36A regulate the screen holding unit 5. FIG. 6 shows the structure of this modified example applied to the screen unit 1 in the first embodiment. According to this example, the regulating members 36A are disposed at positions different from the positions of the regulating members 36 in the first embodiment, and regulate a component different from the corresponding component in the first embodiment. Other structures are similar to the corresponding structures in the first embodiment. The parts in this example similar to the corresponding parts in the first embodiment are given similar reference numbers.

As illustrated in FIG. 6, the regulating members 36A are provided to regulate the screen holding unit 5. A pair of the regulating members 36A are disposed on the inner side surface of the housing 3 in the longitudinal direction of the screen holding unit 5 (X direction). The positions of the regulating members 36A are determined at such positions that the screen holding unit 5 can be stored within the housing 3. The regulating members 36 receive a lower surface 5A of the screen holding unit 5 to regulate the downward movement of the screen holding unit 5 (−Y direction). Under the condition in which the downward movement of the screen holding unit 5 is regulated by the regulating members 36A, the contracting movement of the pantograph mechanism 4 is also regulated, whereby the second arm support member 43 stops moving in the +X direction. The other operations are similar to the corresponding operations in the first embodiment, and the same explanation is not repeated.

According to the screen unit 1 in the first embodiment, the guide projection 731 is equipped on the translatory member 73 as a component for preventing the rotation of the translatory member 73 following the rotation of the shaft member 72. However, the component for preventing the rotation of the translatory member 73 may be other parts considered as optimal elements.

According to the screen unit 1 in the first embodiment, the projection 371 which fixes the other end of the wire 8 is disposed substantially at the center of the inner surface of the cover 37. However, the projection 371 may be located other positions considered as optimal locations. This modification may be incorporated in the screen unit 1A in the second embodiment.

According to the screen unit 1A in the second embodiment, the pressing portion 73A is equipped at the tip of the shift member 72A to fix the one end of the wire 8 and press the second arm support member 43A. However, the pressing portion 73A is not required to be provided. When the pressing portion 73A is not equipped, the shift member 72A may be so structured that the one end of the wire 8 is fixed to a desired position of the shift member 72A, and that the second arm support member 43A is pressed by a desired position of the shift member 72A.

According to the screen unit 1 in the first embodiment, the urging members 38 are equipped. However, the urging members 38 are not required to be provided. When the urging members 38 are not equipped, the pantograph mechanism 4 and the screen holding unit 5 may directly contact the cover 37 to open the cover 37 in accordance with the expanding operation of the pantograph mechanism 4. This modification may be incorporated in the screen unit 1A in the second embodiment.

The entire disclosure of Japanese Patent Application No. 2011-22434, filed Feb. 4, 2011 is expressly incorporated by reference herein.

What is claimed is:

1. A screen unit, comprising:
a flexible and substantially rectangular screen;
a link mechanism which stretches and contracts while holding the screen to expand and store the screen;
a housing which has a cover opening and closing at the time of expansion and storage of the screen, and accommodates the screen and the link mechanism;
an actuator which is disposed within the housing and shifts one end of the link mechanism to stretch and contract the link mechanism; and
a linear member one end of which is held by the actuator and the other of which is held by the cover to close the cover in accordance with the contraction of the link mechanism effected by the actuator.

2. The screen unit according to claim 1, wherein
the actuator has a motor, a shaft member rotated by the motor, and a translatory member which translationally shifts in accordance with the rotation of the shaft member; and
the one end of the linear member is held by the translatory member.

3. The screen unit according to claim 2, wherein the translatory member is provided in such a condition as to freely contact and move away from the one end of the link mechanism, and shifts the one end of the link mechanism by the contact with the one end of the link mechanism.

4. The screen unit according to claim 3, further comprising:
a regulating member which regulates at a predetermined position shift of the link mechanism in the contracting direction of the link mechanism,
wherein the cover is closed by shift of the translatory member under the condition in which the shift of the link mechanism is regulated by the regulating member.

5. The screen unit according to claim 1, wherein
the actuator has a motor, and a shift member which moves forward and backward by the drive of the motor; and
the one end of the linear member is held by the shift member.

6. The screen unit according to claim 5, wherein the shift member is provided in such a condition as to freely contact and move away from the one end of the link mechanism, and shifts the one end of the link mechanism by the contact with the one end of the link mechanism.

7. The screen unit according to claim 6, further comprising:
a regulating member which regulates at a predetermined position the one end of the link mechanism in the contracting direction of the link mechanism,
wherein the cover is closed by shift of the shift member under the condition in which the shift of the link mechanism is regulated by the regulating member.

8. The screen unit according to claim 1, further comprising an urging member which urges the cover in the opening direction of the cover.

* * * * *